United States Patent
Jacisin et al.

[15] 3,697,089
[45] Oct. 10, 1972

[54] HIGH-PRESSURE PACKING GLAND
[72] Inventors: Joseph Michael Jacisin; Sam Duane Tropello, both of Parsippany, N.J.
[73] Assignees: Bell Telephone Laboratories, Incorporated, Murray Hill, N.J.; Western Electric Company, Incorporated, New York, N.Y. ; part interest to each
[22] Filed: Dec. 30, 1970
[21] Appl. No.: 102,668

[52] U.S. Cl. ............................... 277/35, 174/65 SS
[51] Int. Cl. ........................ F16k 41/04, B65d 53/04
[58] Field of Search ......... 174/65 SS, 151; 277/3, 27, 277/35, 64, 44; 285/250; 287/75

[56] References Cited
UNITED STATES PATENTS
3,113,999  12/1963  Heikkinen .................. 174/151
2,470,546  5/1949  Carlson ..................... 285/250

Primary Examiner—William F. O'Dea
Assistant Examiner—Robert I. Smith
Attorney—R. J. Guenther and William L. Keefauver

[57] ABSTRACT

A high-pressure packing gland adapted for surrounding a portion of a wire having an external polymeric covering. The packing gland comprises layers of viscoelastic material compressed around the covered wire for exerting a restraining frictional force thereon. This force is distributed at spaced intervals along the wire by layers of incompressible material interlocated between the layers of viscoelastic material thus forming a series of annular indentations in the polymeric covering for increasing the restraining effect. An additional layer of viscoelastic material has a different characteristic which causes it to form a deeper annular indentation for impeding the extrusion of the polymeric covering.

3 Claims, 7 Drawing Figures

INVENTORS
J. M. JACISIN
S. D. TROPELLO

BY
*B. F. Stoddard*

ATTORNEY

PATENTED OCT 10 1972 3,697,089

HIGH-PRESSURE PACKING GLAND

GOVERNMENT CONTRACT

The invention herein claimed was made in the course of or under a contract with the Department of the Navy.

BACKGROUND OF THE INVENTION

This invention relates to packing glands and, more particularly, to a high-pressure packing gland adapted for surrounding a portion of a wire having an external covering of plastically deformable material and extending out of a port in a pressure vessel.

Packing glands which are used for sealing the passage of a wire, such as an electrical conductor or cable, through a port in a pressure vessel must be capable of withstanding the effects of being highly pressurized and stressed. When one of the functions of these packing glands is to hold securely a wire extending out of a pressure vessel and to prevent the wire from being displaced by the pressure inside the vessel, the construction must be such that the packing material will mechanically grip and firmly hold the wire. This also requires that the packing material will not fail under pressure and thereby allow the pressure inside the vessel to force the wire out of the port in the vessel. In addition, when the wire has an external covering of plastically deformable material, such as polyethylene, care must be exercised so that the stresses produced in the covering material will not be so excessive as to exceed the material strength of the covering material and thereby cause it to fail or be extruded.

SUMMARY OF THE INVENTION

The present invention is designed to meet the above-mentioned requirements by providing a high-pressure packing gland of improved construction. Accordingly, the packing gland comprises a body member having a cavity containing layers of viscoelastic material disposed in a stacked formation with a bore formed therein for normally receiving the covered wire. Means are included for compressing the stacked formation sufficiently to distort the viscoelastic material so as to effect its constriction around the covered wire for exerting a restraining frictional gripping force thereon. Layers of incompressible material are interlocated between the layers of viscoelastic material for distributing the frictional gripping force at spaced intervals along the wire thus forming a series of annular indentations in its compressible covering material and thereby increasing the restraining effect.

Extrusion of the covering material around the wire is impeded by employing at least one additional layer of viscoelastic material having a different characteristic such that it responds to the compressive force by constricting to a greater extent around the wire for forming a deeper annular indentation in its compressible covering. Utilization of several layers of viscoelastic material each having a different characteristic imposes a plurality of gripping forces of different intensities upon the wire and produces annular indentations of respectively different depths in its compressible covering. The packing gland may also be adapted for use with several electrical conductors passing through it.

BRIEF DESCRIPTION OF THE DRAWING

The features of this invention are fully discussed hereinafter in relation to the following detailed description of the drawing in which.

DETAILED DESCRIPTION

Figure 1:
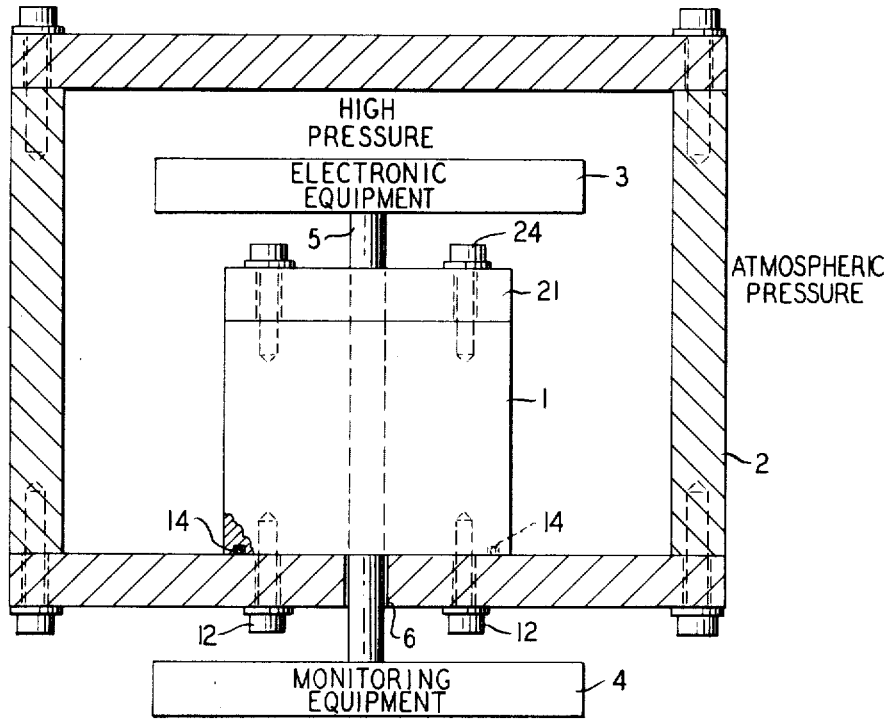
FIG. 1 is a sectional front view of a pressure vessel having the packing gland of this invention mounted therein.

An exemplary packing gland 1 constructed in accordance with this invention is illustrated in FIG. 1 as being mounted inside a pressure vessel 2. In this illustrative embodiment of the invention, the exterior of the pressure vessel is at atmospheric pressure and its interior contains a fluid which is pressurized to 15,000 psi. Electronic equipment 3 is mounted inside the pressure vessel 2 and is electrically connected to monitoring equipment 4 which is mounted outside the pressure vessel 2. The electrical connection is effected by means of an electrical conductor 5 extending from the electronic equipment 3, through the packing gland 1, and then out to the monitoring equipment 4 by way of a port 6 formed in the base of the pressure vessel 2. This port 6 is of such size as to receive snugly therein the electrical conductor 5.

Figure 2:
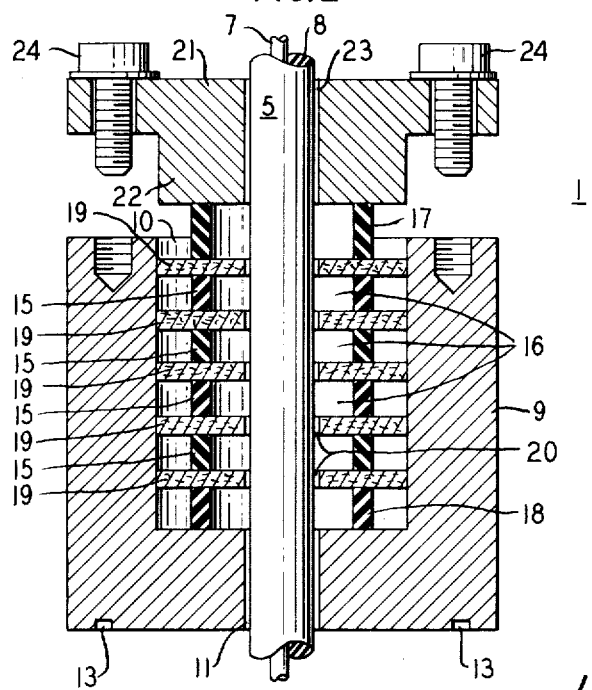
FIG. 2 is a sectional front view of an exemplary embodiment of a packing gland constructed in accordance with this invention and having its components illustrated in their uncompressed condition.

As is represented in FIG. 2, the electrical conductor 5 comprises a central elongated core member in the form of a wire, or cable, 7. The wire 7 has an external covering of insulation 8 which is made of incompressible, but plastically deformable, material, such as polyethylene.

FIG. 2 also shows that the packing gland 1 comprises a body member 9 which is constructed of suitable pressure-resistant material. The body member 9 is illustrated as being formed with a cavity, or well, 10 having a uniform width. The cavity 10 is provided with a hole 11 extending through its bottom portion. This hole 11 is of approximately the same size as the port 6 so as to receive snugly therein the electrical conductor 5. The body member 9 is fixedly attached to the lower interior surface of the pressure vessel 2 by any suitable means, such as by a plurality of belts 12 as is indicated in FIG. 1. It should be noted that the body member 9 is so located that its hole 11 is aligned with the port 6 thus permitting the electrical conductor 5 to enter therethrough. In order to seal the attachment of the body member 9 to the pressure vessel 2, the bottom surface of the body member 9 has a channel, or groove, 13 formed therein, as is represented in FIG. 2, for receiving an O-ring 14 which is known in FIG. 1.

The packing gland 1 further comprises gripping means which are adapted for applying a series of gripping forces against the external polymeric covering 8 of the wire 7 in a direction that is perpendicular to the longitudinal axis of the electrical conductor 5. These gripping means include a plurality of layers 15 of a suitable viscoelastic material, such as rubber, arranged in a single stacked formation which has a bore 16 extending therethrough. As is indicated in FIG. 2, the bore 16 normally has a size which, before the layers 15 are distorted by compression, is substantially larger than the circumference of the electrical conductor 5.

The packing gland 1 also comprises two additional layers of viscoelastic material 17 and 18, and a plurality of layers 19 of a suitable incompressible material, such as fiberboard. Each of the fiberboard layers 19 has a width which is approximately the same as the width of the cavity 10. In addition, each of the layers 19 has a bore 20 formed therein of approximately the same size as the hole 11 for snugly receiving therein the circumference of the conductor 5.

In order for the layers 15 of viscoelastic material to apply a series of gripping forces to the electrical conductor 5, they must be compressed. This is accomplished by employing compressing means comprising a plate, or cover, 21 which is designed to be mounted over the top of the body member 9. As is shown in FIG. 2, the bottom of the plate 21 has a downwardly extending portion 22 of such size as to be adapted to fit snugly inside the cavity 10. A bore 23 is formed through the plate 21 and its bottom portion 22 for snugly receiving therein the conductor 5.

Figure 3:
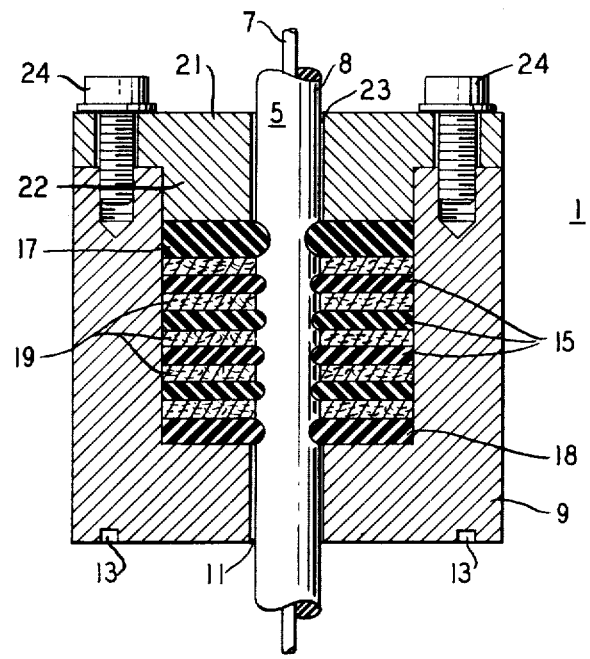
FIG. 3 is a sectional front view somewhat similar to FIG. 2 but showing the components of the packing gland in their compressed condition.

A plurality of bolts 24 are provided for fastening the plate 21 to the top of the body member 9. The tightening of the bolts 24 functions to drive the extended bottom portion 22 of the plate 21 down inside the cavity 10 of the body member 9 as is illustrated in FIG. 3. This applies a compressive force to the stacked formation of layers 15 in sufficient degree to distort, or plastically deform, the viscoelastic material and to effect its constriction around the covered wire conductor 5 to such an extent as to exert a restraining frictional force thereon for mechanically holding the electrical conductor 5 and for preventing its displacement by the high fluid pressure inside the vessel 2.

The pressure thus exerted upon the incompressible polymeric covering 8 by the constriction of the viscoelastic layers 15 creates internal stresses in the polymeric material 8. This functions to increase the holding, or restraining, effect because the coefficient of friction of the viscoelastic material 15, which is rubber in this embodiment of the invention, upon stressed polyethylene is much greater than it is upon unstressed polyethylene. However, if this pressure should become too great, the resulting internal stresses in the polymeric covering 8 might become so large that its material strength would be exceeded and it would fail in shear. Such failure is minimized in accordance with this invention by employing distributing means for distributing the above-mentioned restraining frictional force along the electrical conductor 5 at spaced intervals.

These distributing means are constituted by the layers 19 of incompressible material which are interlocated in the stacked formation in such a manner that each layer 19 of incompressible material is interposed between a respectively different pair of the layers 15 of viscoelastic material. Conversely, each of the layers 15 of viscoelastic material may be regarded as being interlocated, or interposed, between a respectively different pair of the layers 19 of incompressible material. In either case, it can be seen in FIG. 3 that the total frictional gripping force exerted by the distorted layers 15 of viscoelastic material is separated, or distributed, by the layers 19 of incompressible material into a series of gripping forces which are spaced apart along the conductor 5 by distances corresponding to the thicknesses of the individual layers 19 of incompressible material.

The above-mentioned series of distributed gripping forces is sufficiently strong to cause the incompressible polymeric covering 8 around the wire 7 to become highly stressed to such an extent that the polymeric covering 8 becomes plastically deformed. This plastic deformation of the covering 8 produces cold flow of the polymeric material 8 and causes it to fill voids in the bores 16 and 20 and interstices between the layers 15 and 19. The highly stressed condition of the polymeric material 8 creates internal stresses therein which function to increase its compactness, such as by squeezing out bubbles of air. This, in turn, increases its shear strength. Accordingly, the material strength of the polyethylene 8 will now become greater than when it was not stressed and this will function to increase its ability to resist extrusion.

Figure 4:
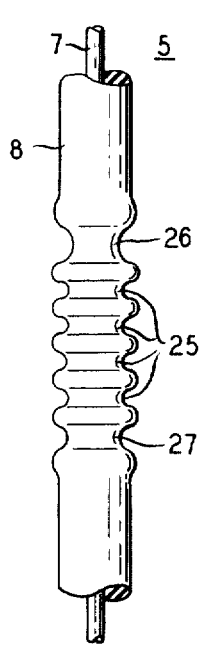
FIG. 4 is a front view of an electrical conductor represented in the condition wherein its polymeric covering has had a series of annular indentations and bulges formed therein by the gripping forces exerted by the packing gland.

In addition, the plastic deformation of the covering 8 will cause a series of annular indentations 25 to be formed therein as is best illustrated in FIG. 4 wherein it can be seen that they are spaced apart by distances corresponding substantially to the thicknesses of the individual layers 19 of incompressible material. It should be noted that the portions of the polymeric covering 8 which adjoin the indentations 25 have a somewhat larger diameter than the diameter of the normally unstressed covering 8 so that they form bulges. Since these bulges are more compact than the unstressed polyethylene, they have a greater material strength. Thus, due to the formation of this series of bulges and indentations 25, the total restraining, or holding, force exerted by the packing gland 1 upon the conductor 5 is enhanced.

It should be noted that, as was stated above, the bore 16 in the layers 15 of viscoelastic material is of a size which, before distortion by the compressing means comprising the cover plate 21 and its bolts 24, is substantially larger than either the circumference of the conductor 5 or the size of the bore 20 in the layers 19 of incompressible material. Also, as is shown in FIG. 2, the width of each of the viscoelastic layers 15 is substantially less than either the width of the incompressible layers 19 or the width of the cavity 10 in the body member 9.

In response to the compressive force exerted by the cover plate 21, due to the tightening of its bolts 24, the viscoelastic layers 15 become plastically deformed. Accordingly, as is illustrated in FIG. 3, the thicknesses of the viscoelastic layers 15 become reduced while their widths increase so as to equal the width of the cavity 10. At the same time, the circumference of the bore 16 in the viscoelastic layers 15 becomes smaller than the normal undistorted circumference of the polymeric covering 8 around the wire 7. It is this diminishing of the circumference of the bore 16 in the viscoelastic layers 15 which produces the indentations 25 in the polymeric covering 7.

Extrusion, or cold flow, of the polymeric covering material 8 through the upper portion of the bore 16 in the viscoelastic layers 15 is impeded by means of the above-mentioned additional layer 17 of viscoelastic material which is located at the top of the stacked formation of layers 15 and 19. As can be seen in FIG. 2, this top viscoelastic layer 17 is separated from the nearest viscoelastic layer 15 by the uppermost layer 19 of imcompressible material. Also, the top layer 17 has a different characteristic than each of the viscoelastic layers 15 such that it is adapted to respond to the compressive force by constricting around the polymeric covering 8 to a greater extent for forming therein a deeper annular indentation which is indicated by the reference numeral 26 in FIG. 4.

In order to produce this deeper indentation 26, the gripping force exerted by the top viscoelastic layer 17 must be stronger than each of the gripping forces of the layers 15 so that it can apply a greater degree of constriction. To obtain this greater gripping force, at least one of the characteristics of the top layer 17 must be different from the characteristics of the layers 15. Some of the characteristics that can be effective to produce the desired result are hardness, vertical dimension or thickness, horizontal dimension or width, and the size of its central bore. In this embodiment of the invention, the top layer 17 is designed to be substantially thicker than each of the layers 15 so that, when it is compressed, it will bulge to a greater extent as is indicated in FIG. 3.

Similarly, extrusion of the polymeric material 8 through the lower portion of the bore 16 is impeded by means of the above-mentioned additional layer 18 of viscoelastic material which is positioned at the bottom of the stacked formation of layers 15 and 19. This bottom viscoelastic layer 18 is separated from the nearest intermediate viscoelastic layer 15 by the lowermost layer 19 of imcompressible material.

It should be noted that this bottom viscoelastic layer 18 has a characteristic which is different from those of the top layer 17 and the intermediate layers 15. Specifically, the bottom layer 18 is so fabricated that it is thicker than each of the intermediate layers 15 but is not as thick as the top layer 17. Accordingly, when compression is applied, the bottom layer 18 will produce a gripping force of a greater intensity than any of the gripping forces generated by the intermediate layers 15 but not as great as that caused by the top layer 17. In response to this compressive force exerted by the bottom layer 18, an annular indentation 27 is formed in the polymeric covering 8. As is indicated in FIG. 4, this lowermost indentation 27 is deeper than any of the intermediate indentations 25 but is not as deep as the uppermost indentation 26.

Thus, the packing gland 1 of this invention is adapted to produce a plurality of gripping forces of different intensities for making annular indentations of respectively different depths in the polymeric covering 8 of the wire 7.

Figure 5:
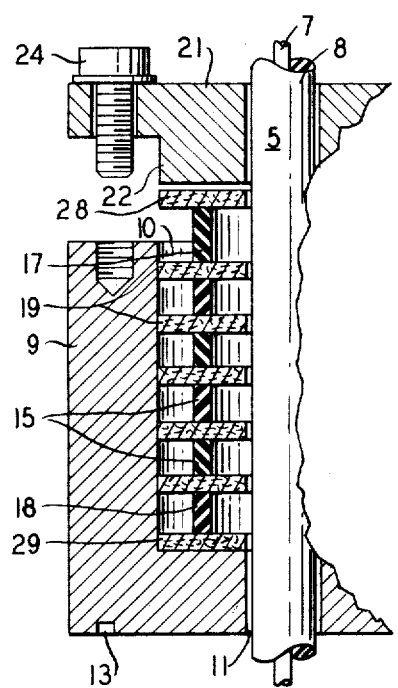
FIG. 5 is a fragmentary sectional front view somewhat similar to FIG. 2 but showing a modified configuration of the components of the packing gland.

It is to be understood that the above-described interlocation and configuration of the incompressible layers 19 and the viscoelastic layers 15, 17, and 18 may be varied to meet the requirements of a particular packing gland. For example, these layers may be disposed in the manner shown in FIG. 5 wherein it can be seen that the stacked formation of layers has a layer 28 of incompressible material at its top and another layer 29 of incompressible material at its bottom. In addition, the stacked formation illustrated in FIG. 5 includes intermediate incompressible layers 19 and viscoelastic layers 15, 17, and 18, all of which are the same as those shown in FIGS. 2 and 3. Thus, in the stacked formation of FIG. 5, each of the viscoelastic layers 15, 17, and 18 is interlocated between a respectively different pair of the layers 19, 28, and 29 of incompressible material. It is also to be understood that various modifications may be made in the number and thicknesses of both the incompressible and the viscoelastic layers employed in a particular packing gland.

Figure 6:
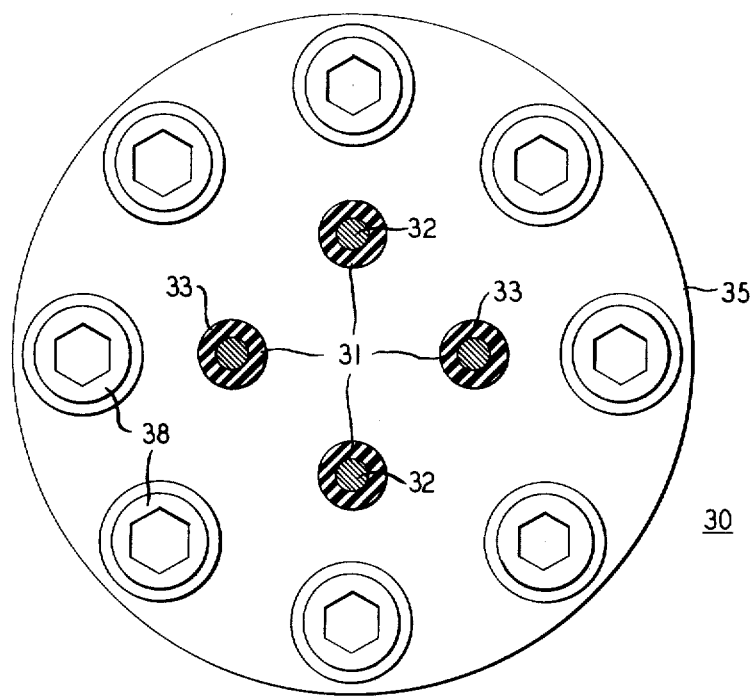
FIG. 6 is a plan view of the top of a packing gland adapted in accordance with this invention for use with several electrical conductors passing through it.
Figure 7:
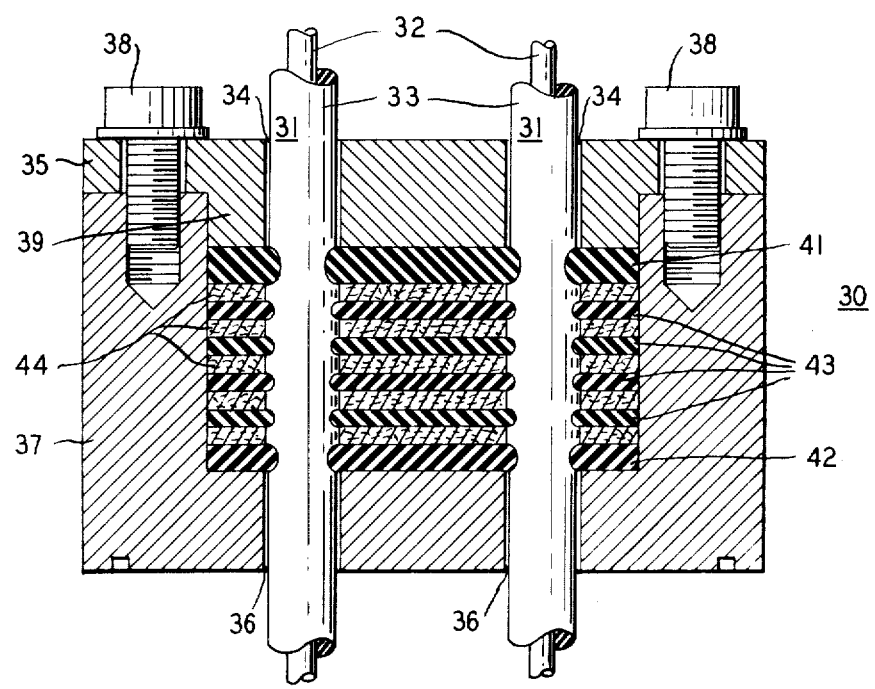
FIG. 7 is a sectional front view of the packing gland of FIG. 6 with its components shown in their compressed condition.

As was stated above, the packing gland of this invention may also be adapted for use with several electrical conductors passing through it. Accordingly, such a modified packing gland 30 is illustrated in FIGS. 6 and 7 wherein it can be seen that it surrounds four electrical conductors 31 each comprising an electrically conductive wire 32 surrounded by an external polymeric covering 33. These conductors 31 are adapted to pass snugly through holes 34 in a cover plate 35 and also through holes 36 in the bottom portion of a cavity formed in a body member 37. The cover plate 35 is attached to the body member 37 by a plurality of bolts 38 which, when tightened, force a downwardly extending portion 39 of the cover plate 35 to press downward inside the cavity in the body member 37.

The cavity in the body member 37 contains a stacked formation of layers of material similar to the layers shown in FIGS. 2 and 3. Specifically, these layers comprise a number of layers of viscoelastic material including a top layer 41, a bottom layer 42, and several intermediate layers 43. Each of these layers 41, 42, and 43 is so constructed as to correspond respectively to the layers 17, 18, and 15 described above except that each of the layers 41, 42, and 43 has four bores formed therein for receiving the four electrical conductors 31.

The stacked formation also includes a plurality of layers 44 of incompressible material. Each of these incompressible layers 44 is interlocated between the viscoelastic layers 41, 42, and 43. These incompressible layers 44 are essentially similar to the layers 19 described above except that each of the layers 44 has four bores for receiving therein the electrical conductors 31.

When the bolts 38 are tightened, the bottom portion 39 of the cover plate 35 exerts a compressive force upon all of the layers in the stacked formation. This compressive force is sufficient to distort the viscoelastic layers 41, 42, and 43 which consequently constrict around the polymeric coverings 33 of the conductors 31 and apply restraining frictional gripping forces thereto. In the same manner as was described above, these gripping forces form annular indentations in the polymeric coverings 33 of the conductors 31 thus enhancing the restraining frictional forces while impeding extrusion of the polymeric coverings 33.

What is claimed is:

1. A high-pressure packing gland adapted for surrounding a portion of an elongated core member having an external polymeric covering, said packing gland comprising gripping means adapted for applying a series of gripping forces against said polymeric covering in a direction that is perpendicular to the longitudinal axis of said elongated core member, said gripping means including a plurality of layers of viscoelastic material disposed in a single stacked formation, said stacked formation of layers having means defining a bore formed therein, said polymeric covered core member being normally disposed within said bore and extending therethrough, compressing means for applying a compressive force to said stacked formation of layers in sufficient degree to distort said viscoelastic material and to effect its constriction around said polymeric covering to such an extent as to exert a restraining frictional force thereon, said packing gland being characterized by having distributing means for distributing said frictional force along said core member at spaced intervals for forming a series of annular indentations in said polymeric covering for increasing said restraining frictional force, said distributing means including a plurality of layers of incompressible material disposed in said stacked formation in such a manner that each of said layers of incompressible material is interposed between a respectively different pair of said layers of viscoelastic material whereby said annular indentations are spaced apart by distances corresponding to the thicknesses of the individual layers of said incompressible material, and impeding means for impeding extrusion of said polymeric covering through said bore, said impeding means including an additional layer of viscoelastic material disposed in said stacked formation for receiving said compressive force, and said additional layer of viscoelastic material having a different characteristic than each of the layers in said plurality of layers of viscoelastic material such that it is adapted to respond to said compressive force by constricting around said polymeric covering to a greater extent for forming therein a deeper annular indentation.

2. A high-pressure packing gland adapted for surrounding a portion of an elongated core member having an external covering of plastically deformable material, said packing gland comprising a plurality of layers of incompressible material disposed in a stacked formation, said stacked formation of layers having means defining a bore therein of such size as to receive snugly therein the circumference of said covered core member, said covered core member being normally disposed within said bore and extending therethrough, gripping means adapted for applying a series of gripping forces along a portion of the length of said core member in a direction that is perpendicular to the longitudinal axis of said core member, said gripping means including a plurality of layers of compressible material disposed in said stacked formation in such a manner that each of said layers of compressible material is interlocated between a respectively different pair of said layers of incompressible material, compressing means for applying a compressive force to said stacked formation of interlocated layers in sufficient degree to compress and distort each of said layers of compressible material for effecting their constriction around said covered core member to such an extent as to form a series of annular indentations in said plastically deformable covering, said annular indentations being spaced apart along the longitudinal axis of said core member by distances corresponding to the thicknesses of the individual layers of said incompressible material, and impeding means for impeding extrusion of said plastically deformable covering through said bore, said impeding means including means for rendering at least one of said gripping forces stronger than the other of said gripping forces for thereby forming a deeper annular indentation in said plastically deformable covering, and said last-mentioned means being constituted by one of said layers of compressible material having a different characteristic than the other of said layers of compressible material such that it responds to said compressive force by applying a greater degree of constriction to said plastically deformable covering.

3. A high-pressure packing gland adapted for surrounding a portion of an electrical conductor having an external covering and extending out of a pressure vessel having a hollow interior which is at a different pressure than the exterior of said vessel, said pressure vessel having means defining a port formed therein, said packing gland comprising a body member having means defining a cavity formed therein with a hole extending through the bottom thereof, means for fixedly attaching said body member to said pressure vessel with said hole aligned with said port, both said port and said hole being of sufficient size for receiving therein said covered conductor, gripping means adapted for applying a series of gripping forces against said external covering of said conductor in a direction that is perpendicular to the longitudinal axis of said conductor, said gripping means including a plurality of layers of viscoelastic material disposed in a stacked formation inside said cavity and on the bottom thereof, said stacked formation of layers having means defining a bore therein adapted for receiving said conductor, said conductor being normally disposed in said bore and also in said hole and said port, compressing means mounted over the top of said cavity and adapted for applying a compressive force to said stacked formation of layers in sufficient degree to distort said viscoelastic material and to effect its constriction around said external covering of said conductor to such an extent as to exert a restraining frictional force thereon, distributing means for distributing said frictional gripping force at spaced intervals along said conductor for forming a series of annular indentations in said external covering for enhancing said restraining frictional force, said distributing means including a plurality of layers of incompressible material positioned inside said cavity and disposed in said stacked formation in such a manner that each of said layers of incompressible material is interlocated between a respectively different pair of said layers of viscoelastic material whereby said annular indentations are spaced apart by distances corresponding to the thicknesses of said incompressible layers, and impeding means for impeding extrusion of said external covering through said bore, said impeding means including an additional layer of viscoelastic material disposed in said stacked formation for receiving said compressive force, and said additional layer of viscoelastic material having a different characteristic than each of the layers in said plurality of layers of viscoelastic material such that it is adapted to respond to said compressive force by constricting around said external covering to a greater extent for forming therein a deeper annular indentation.

* * * * *